Patented Feb. 29, 1944

2,343,228

UNITED STATES PATENT OFFICE 2,343,228

COFFEE AND PROCESS OF TREATING THE SAME

George Sperti, Covington, Ky., assignor to The Institutum Divi Thomae Foundation, Cincinnati, Ohio, a corporation of Ohio No Drawing. Application June 24, 1941,
Serial No. 399,509

12 Claims. (Cl. 99—68)

This is a continuation in part of my application Serial No. 207,303, filed May 11, 1938.

The invention relates to the treatment of coffee, and more particularly to a process for roasting coffee beans either before or after they are ground.

The chemical reactions which take place when green coffee beans are roasted are extremely complicated and not well understood. The roasted coffee beans contain oils and other essential flavoring agents, many of which are readily attacked by the oxygen of the air and are converted into objectionable products. This factor accounts for the introduction of so-called "vacuum packed" coffee, the purpose of which packing is to prevent oxidation of the coffee between the time it is roasted and the time it is used. Since the rate of oxidation depends to a great extent upon the temperature, it will be understood that the oxidation taking place in coffee at room temperature, while appreciable, is slight as compared with the oxidation taking place at the high temperatures of roasting. From this it will be seen that such expedients as vacuum packing to protect the coffee from oxidation at room temperatures are ineffective in preventing the most important and active destruction of the flavor of coffee, including the extremely active oxidation and other chemical changes which take place at the high temperatures of roasting.

It has also been suggested that coffee be roasted under some atmosphere supposed to be less deleterious to coffee than air. Carbon dioxide has been suggested as a medium in which to carry on the roasting of coffee. I have found, however, that the use of a so-called protective atmosphere, i. e., an atmosphere substantially devoid of free oxygen during roasting is not a solution of the problem commercially due to the fact that under ordinary conditions of roasting the readily available atmospheres are not inert to the flavoring constituents of coffee. During a heat treatment the coffee beans give off occluded gases, moisture and volatile products of the general character of essential oils. Under these conditions, and in the presence of these substances, I have found that nitrogen is not inert to the flavoring constituents of coffee. Likewise carbon dioxide has been found by me not to be inert. The chemistry in both instances is probably complex. In the case of carbon dioxide I believe that the gas reacts with water vapor to form carbonic acid which directly attacks the essential oils. The essential oils are also apparently attacked by nitrogen or combinations of nitrogen and hydrogen or oxygen or both. In any event, the quality of the flavor is impaired and detectable bitter tastes are introduced.

Moreover, the problem of securing the best flavor from coffee involves the problem of roasting under such conditions that the flavor-giving volatiles are preserved to the highest possible degree.

The chief objects of my invention are the solution of the problems hereinabove mentioned, and these and other objects which will be set forth hereinafter or will be apparent to one skilled in the art on reading these specifications, I accomplish by that certain procedure and in that product of which I shall now set forth exemplary embodiments.

I have found that it is possible to pretreat coffee either in the bean or ground in such a way as to drive off occluded oxygen and other gases and substantially all the moisture which will be given up on a roasting treatment, under conditions in which the volatile flavoring matters are substantially preserved; and I have further found that, having done this, it is thereafter possible to roast the coffee under an atmosphere which will be truly inert toward the coffee. I have found that if these steps are properly carried on without the intermediate exposure of the coffee to oxidizing conditions, and if the coffee is thereafter cooled under proper precautions, it will not only initially have a better flavor than has hitherto been possible but it will preverse that flavor for a very much greater length of time without protection from oxidation. By proper packing, however, it is possible to preserve the superior flavors of my coffee indefinitely.

The various steps of my process should be carried out without intermediate exposure of the coffee to oxidizing influences. It is thus preferable to carry out the various steps rapidly in point of time, and preferably, though not necessarily, in the same container. In particular, intermediate the steps of my process and at the end thereof there should, for best results, be no cooling cycle in which the coffee is exposed to oxidizing influences.

While it is possible to carry out my process using different containers or treating means with intermediate transfers from one to the other, this involves the taking of special precautions, so that I have found it most convenient to carry on the entire treatment process in a single mechanism which may be a roasting device of ordinary character excepting that provision is made for sealing the container and for admitting and withdrawing gases. At the conclusion of the roasting process the coffee may be transferred from the roaster to a cooling device if desired; but if this is done I prefer to take precautions against oxidation during the cooling period of the coffee.

In carrying out my process in its preferred form I introduce the coffee into a roasting device or oven, and initially treat it under a reduced pressure. The atmosphere in the initial treatment step will, at the start at least, be air under a reduced pressure. As the step proceeds the air will largely be displaced by products given off by the coffee. But I have found that it is not suitable to employ an atmosphere such as carbon dioxide or nitrogen in the first step for reasons which will have been made clear above.

The purpose of the first step is to take off from the coffee occluded oxygen and air together with substantially all of the moisture which would be developed upon roasting, and to do this with the removal of a minimum of the essential flavoring oils. The heat treatment should be at a comparatively low temperature in the initial step, say, at a temperature of around 200° F. although a substantial variation in either direction from this temperature is permissible. It also should be at a reduced pressure, and the general range of pressure is important. If the pressure is too high the moisture and gases will not properly be driven off from the coffee. On the other hand if the pressure is too low, the vapor pressure of the essential oils will be lowered to such a degree that too great a quantity of them will be lost. In practice I generally operate at pressures of the order of substantially 7½ and 8½ inches of mercury on a manometer gage in which 0 inch represents atmospheric pressure. This corresponds approximately to a pressure of say 10 to 13 pounds absolute. Moreover, the pressure should be maintained continuously within the desired range during the initial heat treatment. This not only follows from what has been said above, but is also for the purpose of sweeping out of the container the moisture and occluded gases as rapidly as they are given off so that there is no opportunity for the reabsorption of them by the coffee.

The specific temperature and pressure of the initial treatment may be and preferably is varied in accordance with the known character of the coffee being treated as determined by control tests. Variations both in pressure and in temperature may be made in respect of the moisture content of the coffee and its content of volatile oils. The coffee at the beginning of the initial step of my process will usually be in air dried condition but if it contains more than the usual moisture of air dried coffee, the temperature or pressure or time of treatment or all of these factors may be modified in accordance with the control test. I have found in general that in the initial step of my process, unground coffee beans will give up approximately 25% of their weight in the form of moisture and occluded gases in a low temperature heat treatment at 200° F. in a time of treatment of the order, generally, of 2½ to 3 minutes. While the time of treatment may be based on quantitative tests in view of the statement above, I have also found by the conclusion of the initial step of my process, when properly carried out, the coffee beans begin to exhibit a slight color change; and this also may be taken as a guide.

At the conclusion of the first step of my process the coffee will now be in condition to be roasted and will have been freed of those constituents which render such gases as carbon dioxide and nitrogen active toward the essential oils or other ingredients of the coffee, providing the products given off by the coffee in the first treatment have been removed. Therefore preferably without cooling the coffee (although this may be done if proper precautions against oxidation and the reabsorption of moisture are taken) I now place the coffee in an inert atmosphere and proceed to roast it. Since for reasons which I have already given, it is preferable to carry on the several steps of my process in a single container, I now prefer to lower the pressure in the container rapidly and to as low a point as practical, before admitting the inert gas. This effects an economy in the gas and makes for the more rapid substitution of atmospheres. The lowering of the pressure, however, need not be practiced if precautions are taken to cause the inert gas to sweep the residual atmosphere quite thoroughly out of the container. My best results are attained during roasting if there is no free oxygen present in the atmosphere surrounding the coffee.

As distinguished from the procedure in the initial step of my process, the roasting should not in most instances be carried out under reduced pressures. The moisture and occluded gases will already have been driven off from the coffee; and one problem during roasting is the problem of preserving the volatile constituents in the coffee in spite of the relatively high temperatures used. As a consequence, the inert gas should usually be at least at atmospheric pressure, and in some instances, for the preservation of volatiles, it is desirable to increase the pressure of the inert gas. This increase of pressure can be anything desired within the pressure sustaining capacity of the roasting vessel. In my practice the use of atmospheric or super-atmospheric pressure is determined by control tests on the coffee in which the character and quantity of the volatile essential oils is determined.

The roasting is carried out at the usual temperatures, say from 400 to 500° F. and for the usual length of time, say from 2 to 4 minutes, depending upon the control test results. The coffee at the conclusion of the roasting treatment is now of full flavor and has been protected from oxidation at high temperatures and has also been protected from those deleterious effects which occur during roasting under atmospheres heretofore supposed to be inert, such as carbon dioxide and nitrogen. Of the two atmospheres I prefer an atmosphere of carbon dioxide, having found that it is quite inert at roasting temperatures to coffee from which the moisture and occluded gases have previously been driven.

The coffee should now be cooled to room temperature without exposing it to oxidizing influences. This may be done by permitting a natural cooling in the roasting container, or it may be speeded up by flushing the roasting container with large quantities of the inert gas. It is also possible to remove the coffee from the roasting container and cool it elsewhere, even in the usual cooling apparatus, providing that during cooling it is maintained under an inert atmosphere. As the coffee cools its tendency to oxidize rapidly diminishes until when it has attained room temperature it exhibits very little tendency to oxidize even if thereafter maintained in an atmosphere such as air containing quantities of free oxygen. My researches have indicated that the oxidation occurring during roasting in air, and the chemical changes hitherto attendant upon roasting coffees in other atmospheres than air are far more destructive of the flavor of coffee than is the storage of roasted coffee in contact with air at ordinary temperatures even for great lengths of time. In modern marketing methods where the coffee is delivered to the ultimate user without a delay of more than ten days or two weeks from the time of roasting, oxidation from the air, while it may be detectable, is by no means the chief factor in poor flavor, and is in fact relatively unimportant excepting where the coffee is already in a strongly oxidized or partially rancid condition. Coffees treated in accordance with my process are not found to undergo detectable losses of flavor within periods of from nineteen to twenty-one days. However, if the roasted coffee is to be kept for a very long time its flavor may be completely preserved by methods of so-called vacuum packing.

Although there is a great improvement in the taste and aroma of coffee prepared in accordance with my process, there is also a chemical difference which is ascertainable by tests. I have subjected samples of coffee prepared in accordance with my process and coffee prepared in the conventional manner to spectroscopic tests. I have found that while in ordinary coffees a peak in the absorption coefficient is noted in the vicinity of 3200 angstrom units, in the examination of coffee prepared according to my invention no such peak occurs. On the other hand, where coffee prepared in accordance with my invention is permitted to stand in open air over a period required to produce substantial oxidation, I have found that my coffee also develops the characteristic peak in the absorption coefficient in the vicinity of 3200 angstrom units.

My tests indicate that the peak in the absorption coefficient which I have noted from spectroscopic tests arises from the oxidation of essential flavoring substances in the coffee; and when this peak is missing the coffee has a superior flavor and aroma.

Modifications may be made in my invention without departing from the spirit of it. Having thus described my invention what I claim as new and desire to secure by Letters Patent is:

1. That process of treating coffee which includes the steps of heating the coffee in a rarefied atmosphere of air to a temperature considerably below roasting temperature but sufficient to drive from the coffee occluded gases and moisture to the extent of substantially 25% of the weight of the coffee, substituting an inert gas for said atmosphere and then roasting said coffee in said inert gas.

2. A process of treating coffee which includes the steps of first heating the coffee at a temperature below the roasting temperature but at least as high as substantially 200° F. in an atmosphere of air at sub-atmospheric pressure but not so low as to cause the giving off of large quantities of essential oils, the said heating being continued until the coffee has given up occluded gases and moisture to the extent of substantially 25% of its weight, thereupon substituting for said atmosphere an atmosphere of an inert gas and roasting the coffee in said inert gas while avoiding intermediate contact of said coffee with oxidizing gas.

3. The process of claim 2 wherein said inert gas is carbon dioxide.

4. The process of claim 2 wherein said inert gas is carbon dioxide at greater than atmospheric pressure.

5. That process of treating coffee which comprises causing the coffee to release occluded gases and the moisture content which would normally be given up on roasting by heating the coffee to a temperature below roasting temperature and in a rarefied atmosphere of air of normal carbon dioxide content and, after the moisture content has been so reduced, surrounding the coffee with carbon dioxide and roasting it therein.

6. A process of treating coffee which includes the steps of heating said coffee to a temperature of between substantially 200 and substantially 300° F. for from substantially 2 to substantially 5 minutes in an atmosphere of air at a pressure of substantially 7 to substantially 9 inches of mercury, withdrawing therefrom the moisture and occluded gas given up by the coffee, thereafter surrounding the coffee with carbon dioxide at at least substantially atmospheric pressure, and roasting the coffee therein.

7. A process of treating coffee which includes the steps of heating said coffee to a temperature of between substantially 200 and substantially 300° F. for from substantially 2 to substantially 5 minutes in an atmosphere of air at a pressure of substantially 7 to substantially 9 inches of mercury, withdrawing therefrom the moisture and occluded gas given up by the coffee, thereafter surrounding the coffee with carbon dioxide at at least substantially atmospheric pressure and roasting the coffee therein, and cooling said coffee while still protecting it by an atmosphere of carbon dioxide.

8. A process of treating coffee which comprises introducing coffee into a closed container, rarefying the atmosphere in said container, heating the coffee in said container while withdrawing therefrom the moisture and occluded gases given off by said coffee until said coffee has lost substantially 25% of its weight, thereafter further reducing the pressure of the atmosphere in said container, admitting carbon dioxide thereto until the pressure in said container is at least substantially atmospheric pressure and roasting the coffee in said container under the said atmosphere of carbon dioxide.

9. A process of treating coffee which comprises introducing coffee into a closed container, rarefying the atmosphere in said container, heating the coffee in said container while withdrawing therefrom the moisture and occluded gases given off by said coffee until said coffee has lost substantially 25% of its weight, thereafter further reducing the pressure of the atmosphere in said container, admitting carbon dioxide thereto until the pressure in said container is at least substantially atmospheric pressure and roasting the coffee in said container under the said atmosphere of carbon dioxide, and thereafter cooling the said coffee while still protected by an atmosphere of carbon dioxide.

10. A process of roasting coffee without oxidation which comprises heating air dried coffee to drive therefrom moisture and occluded gases which would react with carbon dioxide to form a non-inert substance, removing the products so driven off, and then without exposing the coffee to oxidizing influences, surrounding it with carbon dioxide and roasting it therein.

11. A process of treating coffee which includes the steps of heating said coffee to a temperature of between substantially 200 and substantially 300° F. for from substantially 2 to substantially 5 minutes in an atmosphere of air at a pressure of substantially 7 to substantially 9 inches of mercury, withdrawing therefrom the moisture and occluded gas given up by the coffee, thereafter surrounding the coffee with carbon dioxide at at least substantially atmospheric pressure, and roasting the coffee therein, at a temperature substantially between 400 to 500° F. and for a time substantially between 2 and 4 minutes.

12. That process of treating coffee which includes the steps of heating the coffee in a rarefied atmosphere of air to a temperature considerably below roasting temperature but sufficient to drive from the coffee occluded gases and moisture to the extent of substantially 25% of the weight of the coffee, substituting an inert gas for said atmosphere and then roasting said coffee in said inert gas, at a temperature of substantially 400 to substantially 500° F.

GEORGE SPERTI.